United States Patent
McAuliffe et al.

(10) Patent No.: US 9,790,986 B2
(45) Date of Patent: Oct. 17, 2017

(54) FOIL BEARING WITH LARGE RADIUS KEY

(71) Applicant: HAMILTON SUNDSTRAND CORPORATION, Windsor Locks, CT (US)

(72) Inventors: Christopher McAuliffe, Windsor, CT (US); Murtuza Lokhandwalla, South Windsor, CT (US); Anthony Santiago, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 10 days.

(21) Appl. No.: 14/966,558

(22) Filed: Dec. 11, 2015

(65) Prior Publication Data

US 2017/0167533 A1    Jun. 15, 2017

(51) Int. Cl.
*F16C 32/06* (2006.01)
*F16C 17/02* (2006.01)

(52) U.S. Cl.
CPC ................................. *F16C 17/024* (2013.01)

(58) Field of Classification Search
CPC .................................................... F16C 17/024
See application file for complete search history.

(56) References Cited

U.S. PATENT DOCUMENTS

| | | | | |
|---|---|---|---|---|
| 4,348,066 A | * | 9/1982 | Agrawal | F16C 17/024 384/124 |
| 4,699,523 A | * | 10/1987 | Hagemeister | F16C 17/024 384/103 |
| 5,228,785 A | | 7/1993 | Saville | |
| 7,070,330 B2 | * | 7/2006 | Agrawal | F16C 17/024 384/103 |
| 8,029,194 B2 | * | 10/2011 | Agrawal | F16C 17/024 384/103 |
| 8,419,283 B2 | * | 4/2013 | McAuliffe | F16C 17/024 384/103 |
| 8,807,921 B2 | | 8/2014 | Struziak | |
| 8,920,032 B2 | | 12/2014 | Rosen | |
| 9,028,149 B2 | * | 5/2015 | Rosen | F16C 17/024 384/103 |
| 9,151,322 B2 | * | 10/2015 | Heshmat | F16C 17/042 |
| 2015/0030270 A1 | | 1/2015 | Heshmat | |
| 2016/0091015 A1 | * | 3/2016 | McAuliffe | F16C 17/024 384/103 |
| 2016/0208847 A1 | * | 7/2016 | McAuliffe | F16C 32/0614 |

FOREIGN PATENT DOCUMENTS

EP    2412994 A2    2/2012

OTHER PUBLICATIONS

European Search Report for Application No. 16203300.5-1751 mailed May 2, 2017. 7 Pages.

* cited by examiner

*Primary Examiner* — Thomas R. Hannon
(74) *Attorney, Agent, or Firm* — Cantor Colburn LLP

(57) ABSTRACT

A gas bearing within a cylinder includes an anti-rotation tab sitting within a key way of the cylinder and a first foil forming an inner loop and an intermediary loop. The inner loop extends in a first direction from a first end to an intermediary portion. The intermediary loop extends from the intermediary to the anti-rotation tab.

8 Claims, 3 Drawing Sheets

FOIL BEARING WITH LARGE RADIUS KEY

BACKGROUND OF THE INVENTION

The present disclosure relates generally to a foil bearing with a trailing edge key, and more specifically, to a thin foil, hydrodynamic gas bearing comprising a trailing edge key to eliminate a foil fatigue failure.

In general, thin foil, hydrostatic journal bearings are used to support a rotating element in rotating machinery such as air cycle machines. Historically, the predominant journal loading was assumed to be static, (due to gravity or acceleration) or synchronous (1 time per shaft rotation); however, recent experience has shown that there are environments that impose a non-synchronous, high-cycle load on the thin foil, hydrostatic journal bearings. The journal bearing is comprised of several elements: top and intermediate foils are formed from a single-piece, double wrap cylindrical foil supported by a corrugated bump foil. When subjected to high levels of nonsynchronous loading, the formed key (anti-rotation) integral to the top/intermediate foil cracks (and in some cases separates). The crack initiates at a tight radius at a bottom of the formed key. The cracking is in part due to the geometry of the tight radius, which is an inherently high stress riser. Further, a forming operation necessary to fold the foil into a 180° bend exceeds an ultimate elongation of the foil itself, which leads to an orange peel condition and a degradation in the material fatigue strength.

BRIEF DESCRIPTION OF THE INVENTION

Embodiments include a gas bearing including an outer foil including a first end and an intermediate portion, the outer foil traversing substantially around an inner circumference of the cylinder, an intermediate foil disposed around at least a portion of the outer foil, the intermediate foil traversing substantially around an inner circumference of the cylinder; and a key connecting the outer foil to the intermediate foil, the key having an inner radius that is at least 2.5 times greater than a thickness of the outer foil.

Other embodiments include a gas journal bearing system including a cylinder having a keyway formed therein. The system also includes an outer foil including a first end and an intermediate portion, the outer foil traversing substantially around an inner circumference of the cylinder, an intermediate foil disposed around at least a portion of the outer foil, the intermediate foil traversing substantially around an inner circumference of the cylinder, and a key connecting the outer foil to the intermediate foil, the key having an inner radius that is at least 2.5 times greater than a thickness of the outer foil and at least partially disposed in the key way.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments described herein relate to a foil bearing with a trailing edge key, and more specifically, to a thin foil, hydrodynamic gas bearing comprising a large radius trailing edge key to reduce or eliminate a non-synchronous or reverse on the thin foil, hydrodynamic gas bearing. An example application of the foil bearing is employing the foil bearing in an air cycle machine (ACM) in an aerospace environment.

Figure 1:
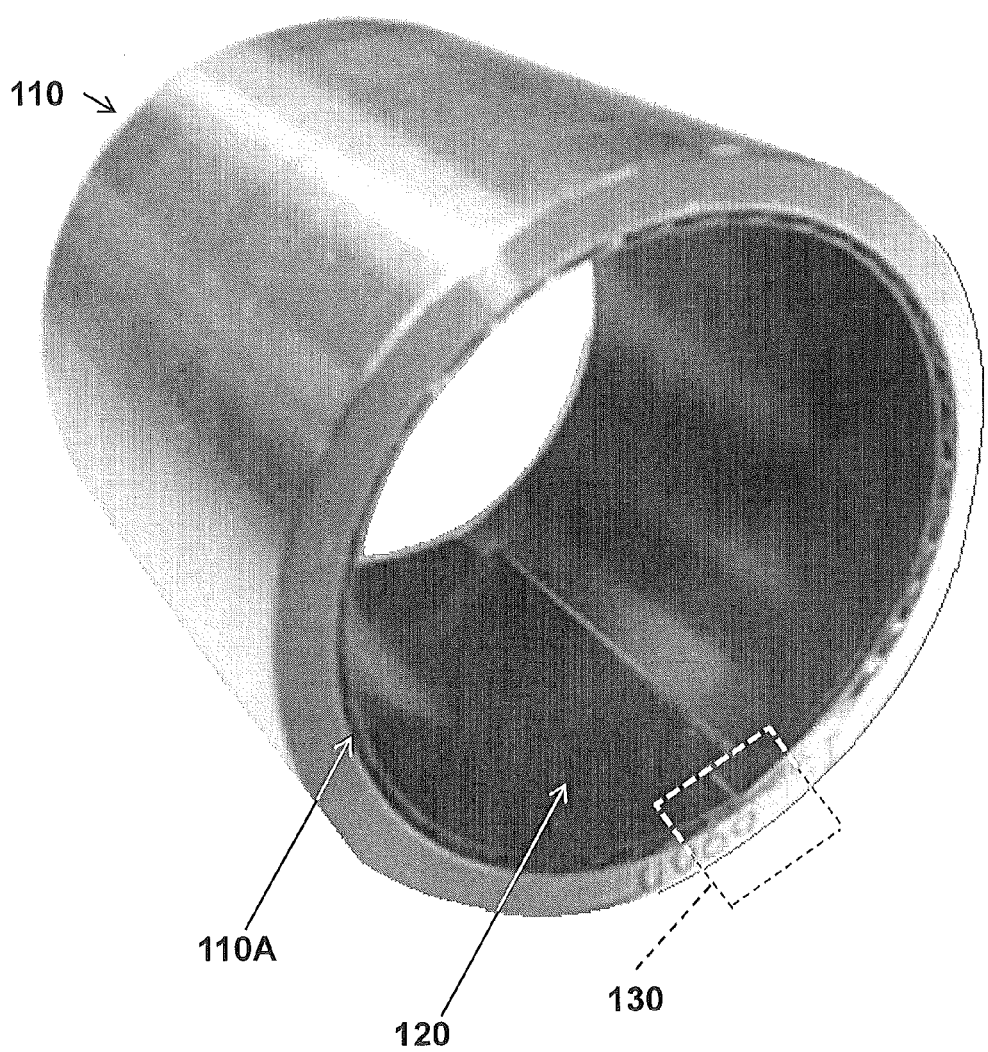
FIG. 1 illustrates a perspective view of a cylinder that houses a gas bearing, which supports a rotating shaft, according to an embodiment of the present invention.

Turning now to FIG. 1, a perspective view 100 of a cylinder 110 that houses within an inner surface 110A a thin foil, hydrodynamic gas bearing 120, which supports a rotating shaft, is shown according to an embodiment of the present invention. Note that the rotating shaft is omitted for clarity in this view. The inner surface 110A may define an inner circumference of the cylinder 100 in the following discussion and claims.

In general, the hydrodynamic gas bearing 120 supports a rotating component of rotating machinery such as an air cycle machine within the cylinder 110. The thin foil, hydrodynamic gas bearing 120 comprises a foil and an air film. The foil is a static portion of the thin foil, hydrodynamic gas bearing 120 that does not rotate and sits within a key way. The air film supports the rotating shaft (i.e., the rotating shaft rides on the air film).

Further, the foil is positioned via a key within the cylinder with respect to the key way (e.g., a thin sleeve, slot, or groove down the length of the cylinder). The intersection of the key and the key way prevents the foils from rotating, moving, sliding, etc. Embodiments of this intersection will be shown with respect to FIGS. 2 and 3, which show a magnified view 130 of FIG. 1.

Figure 2:
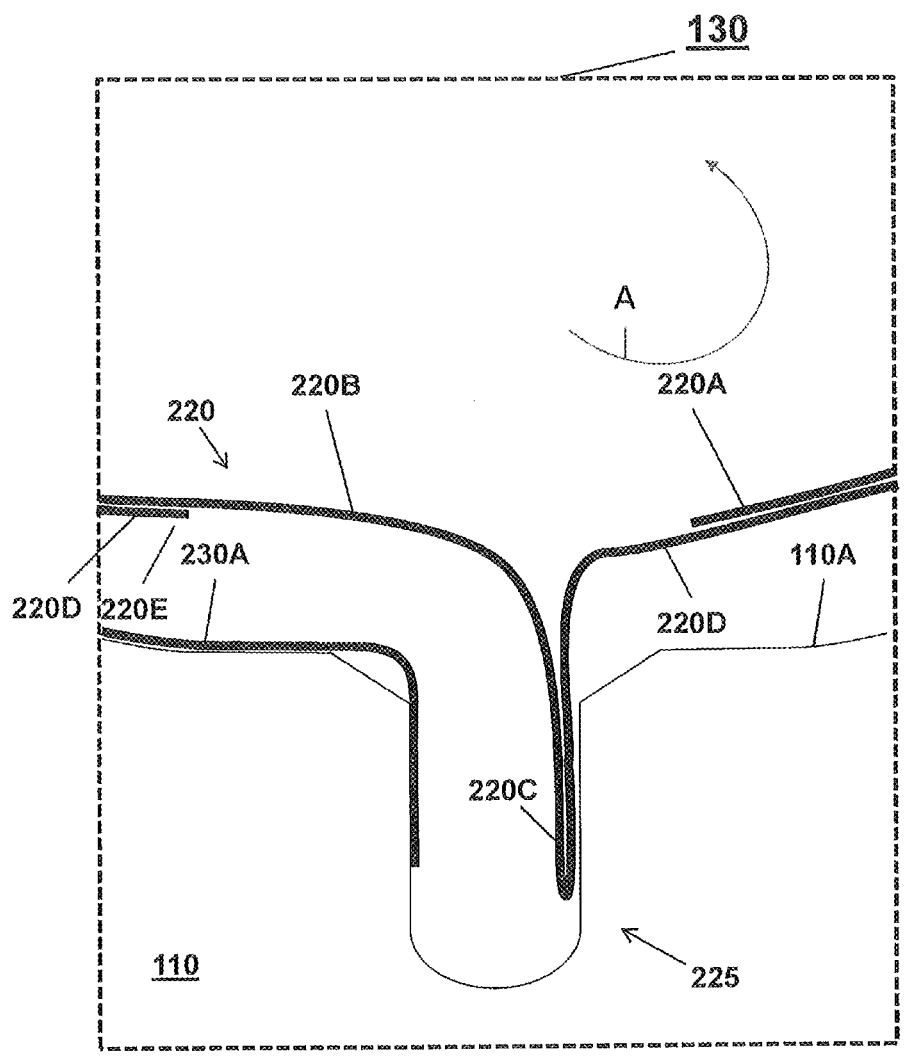
FIG. 2 illustrates an example of the gas bearing intersecting a key way of the cylinder according to the prior art.

FIG. 2 illustrates an example of a portion of a double wrap foil 220 that intersects the cylinder 110 according to an embodiment of the present invention. The cylinder includes a key way 225.

The double wrap foil 220 is a one-piece foil that wraps around the rotating shaft twice and is located within the cylinder 110. That is, the double wrap foil 220 includes an outer foil that extends from a first end 220A in a counterclockwise fashion as indicated by arrow A (Note: counterclockwise is the direction of shaft rotation) along the inner surface 110A (or along the shaft omitted for clarity in this view) to an outer foil end 220B. The double wrap foil 220 also includes an intermediate foil 220D that has an end 220E.

After the outer foil end 220B, a key 220C is formed via a 180° bend. The key 220C is a single anti-rotation tab that sits within the key way 225. The double wrap foil 220, after the key 220C, continues in the counterclockwise fashion to an end 220 of the intermediate foil 220d. Note a corrugated foil 230A is included between the inner surface 110A and the intermediate portion 220B. The 180° bend, according to recent experience, has shown that in some environments a non-synchronous, high-cycle load is imposed. This load has led to anti-rotation cracking (and in some cases separating) of the double wrap foil 220 initiated at or near the key 220C.

Figure 3:
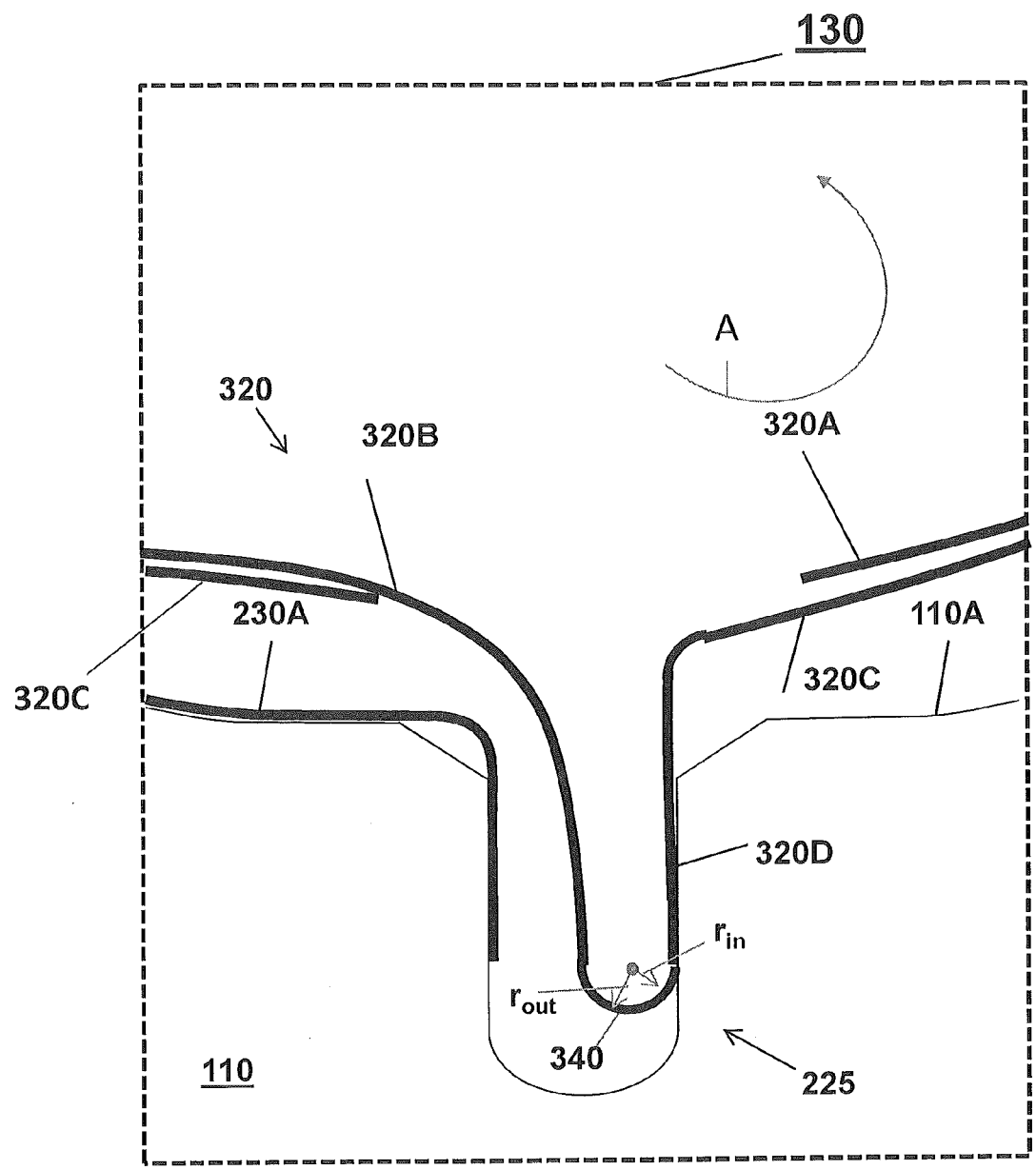
FIG. 3 shows an example of the gas bearing intersecting a key way of the cylinder according one embodiment.

In view of the load issues with the double wrap foil 220, FIG. 3 illustrates another example of a gas bearing having a key 300 that is disposed in a keyway 225 of cylinder. The foil wrap 320 includes an outer foil shown by portions 320A and 320B and an intermediate foil 320C. Both the outer foil and the intermediate foil traverse most or all of the way around an inner circumference of the cylinder 100.

The foil wrap is a one-piece foil 320 that encircles a shaft within the cylinder 110 twice. As seen in FIG. 3, the foil 320 extends from a first end 320A in a counter-clockwise (e.g., direction of shaft rotation) fashion to form a first loop within the inner surface 110A. The first loop concludes at an intermediate portion 320B. Between portions 320A and 320B is the so-called outer foil. The intermediate portion 320B includes a dogleg bend that directs the foil 320 towards a key 320D that connects the intermediate portion 320B to the intermediate foil 220C. The key 320D forms 180 degree bend 320D. Unlike the prior art shown in FIG. 2, this bend is not a sharp bend. In one embodiment, the key 320D has a bend 340 that has an inner bend radius $r_{in}$. In one embodiment, the inner bend radius $r_{in}$ is 2.5 or more times the thickness of the foil forming the outer and intermediate foils. Such a radius distributes the load through the key 320D more evenly and results in lower stresses and the bend 340 than in the bend in FIG. 2.

The key 320D may also include an outer bend radius $r_{out}$ that is equal to or greater 3.5 times the thickness of the foil forming the outer and intermediate foils. Choosing such an outer radius is larger enough to allow forming the bend without exceeding the ultimate elongation for materials typically used for foil bearings and therefore avoids orange-peel stress risers The technical effects and benefits of embodiments of the present invention include creating a foil bearing that is tolerant of non-synchronous or reverse loading and further that comprises a measurably high load capacity. This foil bearing can be utilized in applications with either a high external vibration environment (such as helicopters or engine mounted equipment) or with equipment that experience intermittent reverse rotation (such as permanent magnet electric motors).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas bearing for use in a cylinder, comprising:
an outer foil including a first end and an intermediate portion, the outer foil traversing substantially around an inner circumference of the cylinder;
an intermediate foil disposed around at least a portion of the outer foil, the intermediate foil traversing substantially around an inner circumference of the cylinder; and
a key connecting the outer foil to the intermediate foil, the key having an inner radius that is at least 2.5 times greater than a thickness of the outer foil, the key having an outer radius that is smaller than a size of the of the key way.

2. The gas bearing of claim 1, wherein the outer radius is at least 3.5 times greater than a thickness of the outer foil.

3. The gas bearing of claim 1, wherein the key connects an intermediate portion that defines an end of the outer foil to the intermediate foil.

4. The gas bearing of claim 1, further comprising:
a corrugated foil surrounding the intermediate foil.

5. A gas journal bearing system comprising:
a cylinder having a keyway formed therein;
an outer foil including a first end and an intermediate portion, the outer foil traversing substantially around an inner circumference of the cylinder;
an intermediate foil disposed around at least a portion of the outer foil, the intermediate foil traversing substantially around an inner circumference of the cylinder; and
a key connecting the outer foil to the intermediate foil, the key having an inner radius that is at least 2.5 times greater than a thickness of the outer foil and at least partially disposed in the key way, the key having an outer radius that is smaller than a size of the of the key way.

6. The gas journal bearing system of claim 5, wherein outer radius is at least 3.5 times greater than a thickness of the outer foil.

7. The gas journal bearing system of claim 5, wherein the key connects an intermediate portion that defines an end of the outer foil to the intermediate foil.

8. The gas journal bearing system of claim 5, further comprising:
a corrugated foil disposed between the cylinder and the intermediate foil.

* * * * *